United States Patent
Kinugasa

(10) Patent No.: US 9,890,968 B2
(45) Date of Patent: Feb. 13, 2018

(54) AIR CONDITIONING CONTROL SYSTEM

(71) Applicant: DAIKIN INDUSTRIES, LTD., Osaka-shi, Osaka (JP)

(72) Inventor: Nanae Kinugasa, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 748 days.

(21) Appl. No.: 14/372,189

(22) PCT Filed: Oct. 22, 2012

(86) PCT No.: PCT/JP2012/077201
§ 371 (c)(1),
(2) Date: Jul. 14, 2014

(87) PCT Pub. No.: WO2013/108457
PCT Pub. Date: Jul. 25, 2013

(65) Prior Publication Data
US 2014/0336825 A1    Nov. 13, 2014

(30) Foreign Application Priority Data
Jan. 17, 2012   (JP) ................. 2012-006969

(51) Int. Cl.
   *F24F 11/00*      (2006.01)
   *G05B 15/02*      (2006.01)
   *H02J 3/14*      (2006.01)

(52) U.S. Cl.
   CPC .......... *F24F 11/001* (2013.01); *F24F 11/006* (2013.01); *F24F 11/0012* (2013.01);
(Continued)

(58) Field of Classification Search
None
See application file for complete search history.

(56) References Cited

U.S. PATENT DOCUMENTS

2009/0182456 A1*   7/2009   Liao ................. F24F 11/0001
                                                        700/276
2009/0216379 A1*   8/2009   Smith ................ F24F 11/0012
                                                        700/275

(Continued)

FOREIGN PATENT DOCUMENTS

JP     2001-21193 A     1/2001
JP     2006-336933 A    12/2006
(Continued)

OTHER PUBLICATIONS

International Search Report of corresponding PCT Application No. PCT/JP2012/077201 dated Jan. 22, 2013.
(Continued)

*Primary Examiner* — Isaac T Tecklu
(74) *Attorney, Agent, or Firm* — Global IP Counselors, LLP

(57) ABSTRACT

An air conditioning control system adjusts a consumed energy amount of air conditioners installed in a property in an adjustment time period. The air conditioning control system includes a control apparatus and an assessment apparatus. The control apparatus performs adjustment control of the air conditioners so that the consumed energy amount is adjusted in the adjustment time period. The assessment apparatus adjusts, after the adjustment time period, a possible amount of a next adjustment control based on an environmental parameter of an air conditioned space.

9 Claims, 10 Drawing Sheets

(52) U.S. Cl.
CPC ............... *G05B 15/02* (2013.01); *H02J 3/14* (2013.01); *F24F 2011/0047* (2013.01); *F24F 2011/0073* (2013.01); *F24F 2011/0075* (2013.01); *Y02B 70/3225* (2013.01); *Y02B 70/3275* (2013.01); *Y04S 20/222* (2013.01); *Y04S 20/244* (2013.01)

(56) References Cited

U.S. PATENT DOCUMENTS

| | | | |
|---|---|---|---|
| 2011/0056673 A1* | 3/2011 | Jang | F24F 11/0012 165/201 |
| 2011/0190945 A1* | 8/2011 | Yoshii | F24F 11/0034 700/277 |
| 2011/0257795 A1* | 10/2011 | Narayanamurthy | F24F 5/0046 700/277 |
| 2012/0253592 A1* | 10/2012 | Senthil | F25B 49/022 701/36 |
| 2012/0298348 A1* | 11/2012 | Mise | F24F 11/006 165/287 |
| 2012/0330469 A1 | 12/2012 | Kinugasa et al. | |
| 2013/0085612 A1* | 4/2013 | Takayama | F24F 11/006 700/276 |
| 2013/0166074 A1* | 6/2013 | Hattori | F24F 11/001 700/276 |
| 2014/0163703 A1* | 6/2014 | Chang | G08B 13/19608 700/90 |

FOREIGN PATENT DOCUMENTS

| | | |
|---|---|---|
| JP | 2007-218499 A1 | 8/2007 |
| JP | 2009-216283 A | 9/2009 |
| JP | 2011-193577 A | 9/2011 |
| JP | 2011-253509 A | 12/2011 |
| WO | 2011/111477 A1 | 9/2011 |
| WO | 2011111477 A1 | 9/2011 |

OTHER PUBLICATIONS

International Preliminary Report of corresponding PCT Application No. PCT/JP2012/077201 dated Jul. 31, 2014.
Supplementary European Search Report of corresponding EP Application No. 12 86 5567.7 dated Dec. 18, 2015.

* cited by examiner

| | INDIVIDUAL ASSESSMENTS |
|---|---|
| 1 | ASSESS BASED ON CURRENT TEMPERATURE |
| 2 | ASSESS BASED ON DIFFERENCE BETWEEN CURRENT TEMPERATURE AND CURRENT SET TEMPERATURE OF AIR CONDITIONERS |
| 3 | ASSESS BASED ON DIFFERENCE BETWEEN TEMPERATURE BEFORE START OF ADJUSTMENT TIME PERIOD AND CURRENT TEMPERATURE |

FIG. 8

| SPACE A RESTORED | SPACE B RESTORED |
|---|---|
| SPACE C RESTORED | SPACE D NOT RESTORED |

──────────────→ HIGHER PRIORITY

FIG. 9

AIR CONDITIONING CONTROL SYSTEM

CROSS-REFERENCE TO RELATED APPLICATIONS

This U.S. National stage application claims priority under 35 U.S.C. § 119(a) to Japanese Patent Application No. 2012-006969, filed in Japan on Jan. 17, 2012, the entire contents of which are hereby incorporated herein by reference.

TECHNICAL FIELD

The present invention relates to an air conditioning control system.

BACKGROUND ART

In conventional practice, there have been proposals of energy management systems that adjust the energy amount consumed by an air conditioner during a predetermined time period in order to suppress the energy amount which increases with seasons and/or time ranges, as is disclosed in Japanese Laid-open Patent Application No. 2011-193577, for example.

SUMMARY

Technical Problem

However, when an adjustment of the consumed energy amount of the air conditioner is performed during a predetermined adjustment time period (P1 in FIG. 1) as shown in Japanese Laid-open Patent Application No. 2011-193577, considerable time is needed for the comfort level to be restored in the air conditioned space after this adjustment time period (P1 in FIG. 1). In other words, a restoration time period (P2 in FIG. 1) must be provided. Although it is possible for multiple adjustments to be performed within a single day on the consumed energy amount of the air conditioner, the air conditioned space might become more uncomfortable when adjustments are performed again on the consumed energy amount before the comfort level of the air conditioned space is restored. Conversely, if the comfort level of the air conditioned space has been restored but the opportunity to adjust the consumed energy amount of the air conditioner is missed, the opportunity to conserve energy and/or the opportunity to procure incentives such as discount rates will be missed as well.

In view of this, an object of the present invention is to provide an air conditioning control system in which after an adjustment of the consumed energy amount has been performed, the timing of performing the next adjustment of the consumed energy amount can be appropriately established.

Solution to Problem

An air conditioning control system according to a first aspect of the present invention is an air conditioning control system for adjusting the consumed energy amount of a plurality of air conditioners installed in a property in an adjustment time period, the air conditioning control system comprising a control apparatus and an assessment apparatus. The control apparatus performs adjustment control for controlling the air conditioners so that the consumed energy amount is adjusted in the adjustment time period. After the adjustment time period, the assessment apparatus assesses the possible amount of the next adjustment control on the basis of environmental parameters of the air conditioned space.

In the air conditioning control system according to the first aspect of the present invention, after the adjustment time period, the assessment apparatus assesses the possible amount of the next adjustment control on the basis of environmental parameters of the air conditioned space. The timing for performing the next adjustment control can thereby be decided according to the restoration conditions of the air conditioned space. Therefore, in the air conditioning control system according to the first aspect of the present invention, the timing for performing the next consumed energy amount adjustment can be appropriately established after the adjustment of the consumed energy amount has been performed.

The consumed energy amount is the amount of energy that is consumed. The energy is electricity, for example, and the energy amount is electric power expressed in units such as watts, or an electric power amount expressed in units such as watt-hours, for example.

An air conditioning control system according to a second aspect of the present invention is the air conditioning control system according to the first aspect, wherein at least one environmental parameter is the temperature in the air conditioned space.

In the air conditioning control system according to the second aspect of the present invention, an assessment of whether or not the next adjustment control can be performed is made based on at least the temperature in the air conditioned space. It is thereby possible, after the consumed energy amount adjustment has been performed, to appropriately establish the timing for performing the next consumed energy amount adjustment. The temperature in the air conditioned space is not limited to the current value, and includes past values as well.

An air conditioning control system according to a third aspect of the present invention is the air conditioning control system according to the second aspect, wherein the assessment apparatus has a space restoration assessment part and a property restoration assessment part. When there are a plurality of air conditioned spaces in the property, the space restoration assessment part makes individual assessments, which are assessments of the possible amount of the next adjustment control, on the basis of the environmental parameters for each air conditioned space. The property restoration assessment part makes an overall assessment, which is an assessment of the possible amount of the next adjustment control for the entire property. The property restoration assessment part performs the overall assessment on the basis of the individual assessments.

In the air conditioning control system according to the third aspect of the present invention, when there are a plurality of air conditioned spaces, the space restoration assessment part performs individual assessments, which are assessments of the possible amount of the next adjustment control, for each of the air conditioned spaces. Based on the individual assessments, the property restoration assessment part performs an overall assessment, which is an assessment of the possible amount of the next adjustment control, for the entire property. It is thereby possible to decide the timing for performing the next consumed energy amount adjustment for the entire property in accordance with the restoration conditions of each air conditioned space in the property.

An air conditioning control system according to a fourth aspect of the present invention is the air conditioning control system according to the third aspect, wherein the property restoration assessment part assesses the possible amount of the next adjustment control in the overall assessment, on the basis of the possible amount of the next adjustment control as assessed in the individual assessments. The possible amount of the next adjustment control as assessed in the individual assessments is for the air conditioned spaces that have high priority within the property.

In the air conditioning control system according to the fourth aspect of the present invention, if air conditioned spaces that have high priority within the property are restored, it is assessed that the next adjustment control can be performed. It is thereby possible to perform adjustment control without waiting for all of the air conditioned spaces to be restored. Therefore, after the consumed energy amount adjustment has been performed, an appropriate timing for performing the next consumed energy amount adjustment can be established.

An air conditioning control system according to a fifth aspect of the present invention is the air conditioning control system according to the third aspect, wherein the property restoration assessment part assesses the possible amount of the next adjustment control in the overall assessment, on the basis of the possible amount of the next adjustment control as assessed in the individual assessments. The possible amount of the next adjustment control as assessed in the individual assessments is for a predetermined percentage of the air conditioned spaces within the property.

In the air conditioning control system according to the fifth aspect of the present invention, if a predetermined percentage of the air conditioned spaces within the property are restored, it is assessed that the next adjustment control can be performed. It is thereby possible to perform adjustment control without waiting for all of the air conditioned spaces to be restored. Therefore, after the consumed energy amount adjustment has been performed, an appropriate timing for performing the next consumed energy amount adjustment can be established.

An air conditioning control system according to a sixth aspect of the present invention is the air conditioning control system according to the third aspect, wherein the property restoration assessment part assesses the possible amount of the next adjustment control in the overall assessment, on the basis of the possible amount of the next adjustment control as assessed in the individual assessments. The possible amount of the next adjustment control as assessed in the individual assessments is for all of the air conditioned spaces within the property.

In the air conditioning control system according to the sixth aspect of the present invention, it is assessed that the next adjustment control can be performed when all of the air conditioned spaces within the property have been restored. It is thereby possible to perform the next adjustment control after the comfort level in all the air conditioned spaces has been restored. Therefore, after the consumed energy amount adjustment has been performed, an appropriate timing for performing the next consumed energy amount adjustment can be established.

An air conditioning control system according to a seventh aspect of the present invention is the air conditioning control system according to any of the third through sixth aspects, wherein the space restoration assessment part performs the individual assessments on the basis of the current temperatures in the air conditioned spaces.

In the air conditioning control system according to the seventh aspect of the present invention, the next adjustment control can be performed after the current temperatures in the air conditioned spaces have reached a comfortable state. Therefore, after the consumed energy amount adjustment has been performed, an appropriate timing for performing the next consumed energy amount adjustment can be established.

An air conditioning control system according to an eighth aspect of the present invention is the air conditioning control system according to any of the third through sixth aspects, wherein the space restoration assessment part performs the individual assessments on the basis of the difference between the current temperatures in the air conditioned spaces and the current set temperatures of the air conditioners in the air conditioned spaces.

In the air conditioning control system according to the eighth aspect of the present invention, the next adjustment control can be performed after the current temperatures in the air conditioned spaces have reached a comfortable state. Therefore, after the consumed energy amount adjustment has been performed, an appropriate timing for performing the next consumed energy amount adjustment can be established.

An air conditioning control system according to a ninth aspect of the present invention is the air conditioning control system according to any of the third through sixth aspects, wherein the space restoration assessment part performs the individual assessments on the basis of the difference between the temperatures in the air conditioned spaces before the start of the adjustment time period and the current temperatures in the air conditioned spaces.

In the air conditioning control system according to the ninth aspect of the present invention, the next adjustment control can be performed after the current temperatures in the air conditioned spaces have been restored to the temperatures before the start of the adjustment time period. Therefore, after the consumed energy amount adjustment has been performed, an appropriate timing for performing the next consumed energy amount adjustment can be established.

An air conditioning control system according to a tenth aspect of the present invention is the air conditioning control system according to any of the third through sixth aspects, wherein the space restoration assessment part performs the individual assessments on the basis of chronological fluctuations in the temperatures in the air conditioned spaces during a time period that starts at the present and ends before a predetermined time period.

In the air conditioning control system according to the tenth aspect of the present invention, after the consumed energy amount adjustment has been performed, a more appropriate timing for performing the next consumed energy amount adjustment can be established, because the individual assessments are performed based on chronological fluctuations in the temperatures in the air conditioned spaces.

Advantageous Effects of Invention

In the air conditioning control apparatus according to the first, second, fourth, fifth, sixth, seventh, eighth, and ninth aspects of the present invention, the timing for performing the next consumed energy amount adjustment can be appropriately established after the adjustment of the consumed energy amount has been performed.

In the air conditioning control system according to the third aspect of the present invention, it is possible to decide the timing for performing the next consumed energy amount adjustment for the entire property in accordance with the restoration conditions of each air conditioned space in the property.

In the air conditioning control system according to the tenth aspect of the present invention, after the consumed energy amount adjustment has been performed, a more appropriate timing for performing the next consumed energy amount adjustment can be established.

BRIEF DESCRIPTION OF THE DRAWINGS

FIG. 8 is a table showing multiple examples of assessment methods for the individual assessments;

FIG. 9 is a chart showing an example of individually assessed air conditioned spaces in the property;

DESCRIPTION OF EMBODIMENTS

The following is a description, made with reference to the drawings, of an embodiment of an air conditioning control system according to the present invention.

(1) Overall Configuration

Figure 2:
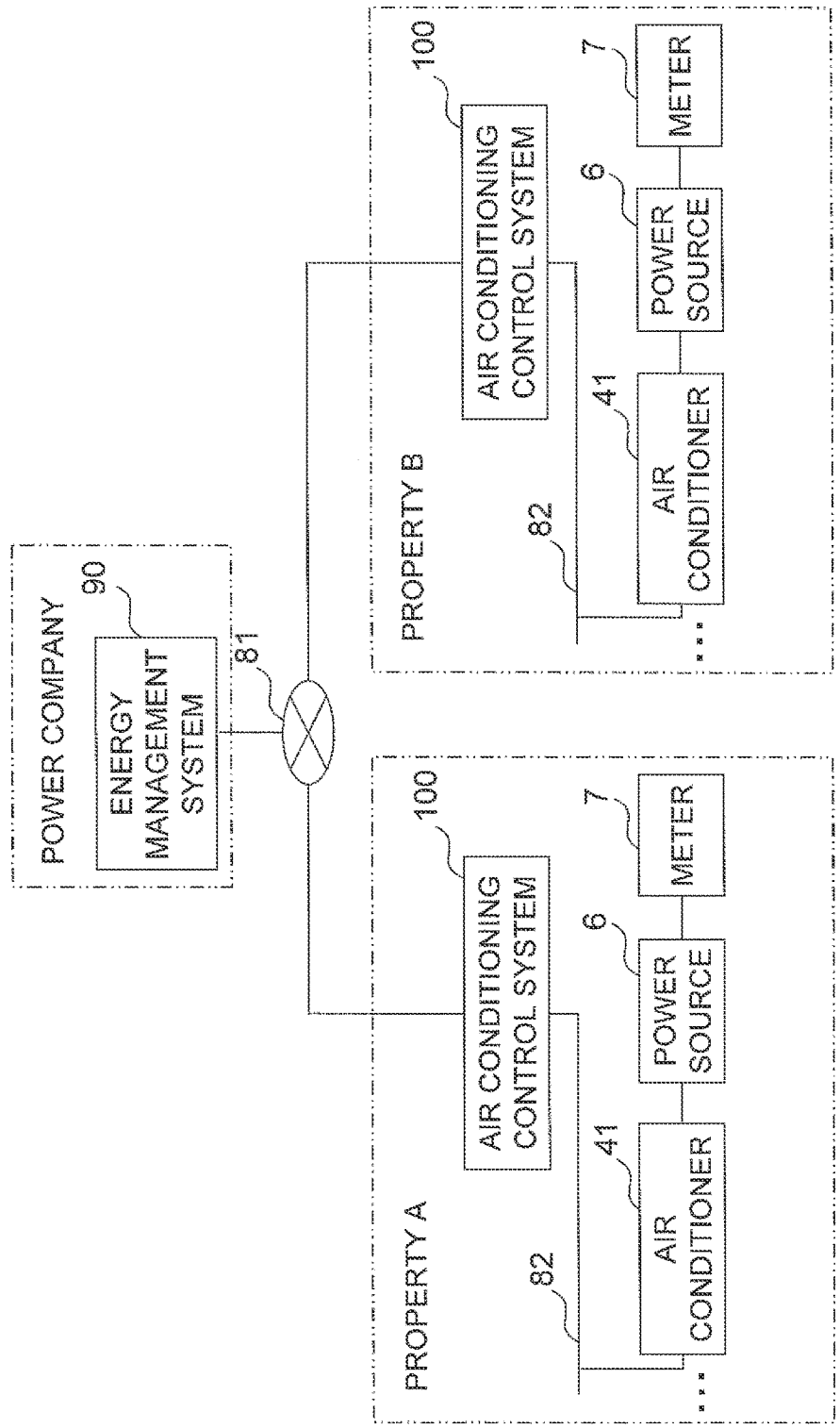
FIG. 2 is a deployment diagram of air conditioning control systems according to the present invention.

FIG. 2 is a schematic configuration diagram of air conditioning control systems 100 which are one example of an air conditioning control system according to the present invention.

Air conditioning control systems 100, which are disposed in properties A, B that are premises such as buildings or factories, manage the consumed energy amount of air conditioners 41, . . . installed in the properties A, B. Also installed in the properties A, B are power sources 6 for supplying energy to the air conditioners 41, . . . , and meters 7 for measuring the energy supplied from the power sources 6 to the air conditioners 41, . . . . The air conditioning control systems 100, the air conditioners 41, . . . , and the meters 7 are connected by a communication network 82 such as a LAN. The air conditioners 41, . . . each have a control part, and the air conditioning control systems 100 control each of the air conditioners 41, . . . by transmitting commands to the control pads via the communication network 82. The air conditioning control systems 100 are connected via a communication network 81 such as the Internet with an energy management system 90 owned by the power company supplying energy to the properties A, B. The consumed energy amount is the amount of energy that is consumed. The energy is electricity, for example, and the energy amount is electric power expressed in units such as watts, or an electric power amount expressed in units such as watt-hours, for example.

The energy management system 90, which is a system configured from one or more computers, manages the energy supplied to the properties A, B by adjusting the supplied amount in response to the demand for energy in a plurality of properties including these properties A, B. Various information pertaining to energy supply and demand is sent and received between the energy management system 90 and the air conditioning control systems 100.

For example, the power company sends a demand adjustment request that requests the consumed energy amount to be suppressed, i.e. the energy demand to be adjusted in a predetermined adjustment time period (referred to as the adjustment time period P1 below), from the energy management system 90 to the air conditioning control systems 100 in both properties A, B. The content of the demand adjustment request, i.e. the suppression amount of the energy amount consumed by all of the air conditioners 41, . . . in both properties A, B, is referred to as the requested suppressed energy amount. The upper limit of the energy amount that can be consumed in order to achieve the requested suppressed energy amount is referred to as the requested energy amount (W1 in FIG. 1). If there are cases in which the requested suppressed energy amount is a value uniquely established by the power company, there are also cases in which the requested suppressed energy amount is a value established based on a suppressible energy amount sent, or in other words, reported, by the air conditioning control systems 100 to the energy management system 90.

Figure 1:
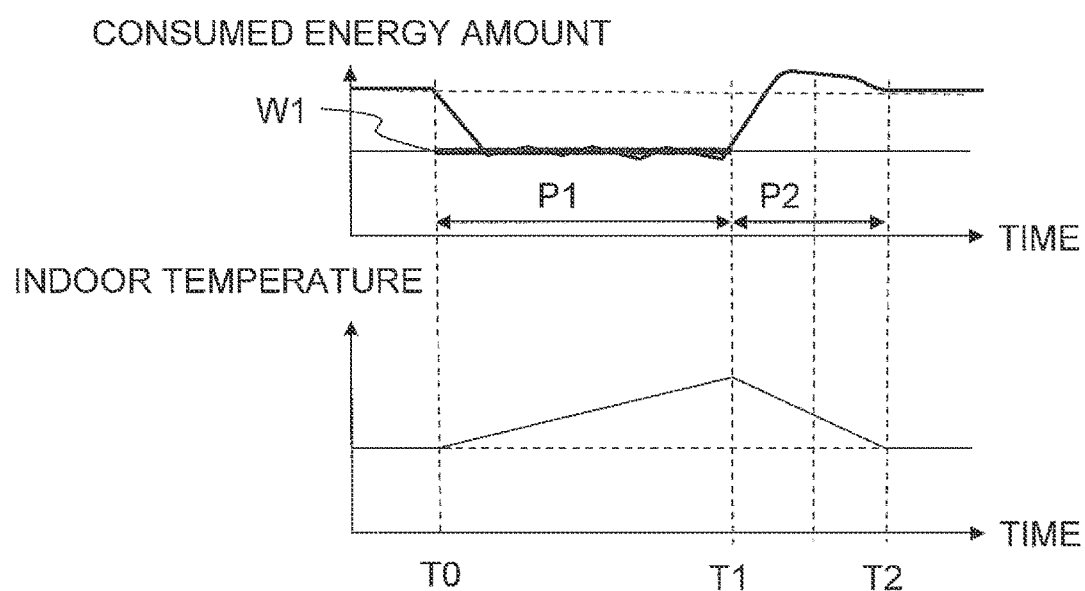
FIG. 1 is a graph showing the transitions over time in the consumed energy amount of all of the air conditioners in a property, and in the temperatures in the air conditioned spaces.

FIG. 1 is a graph showing the transition over time in the consumed energy amount of all of the air conditioners 41, . . . in one property A or B. T0 is the starting time of the adjustment time period P1, T1 is the ending time of the adjustment time period P1, and T2 is the point in time when, after the adjustment time period P1 has ended, the comfort level of the air conditioned spaces is restored. Having received a demand adjustment request, each air conditioning control system 100 performs control so that the consumed energy amount of all of the air conditioners 41, . . . , which are in the property A or B managed by the air conditioning control system 100 in the adjustment time period P1 (for fifteen minutes starting at 3:00 pm, for example) indicated by the demand adjustment request, goes from 500 kW to 400 kW or less, for example; and the air conditioning control system also performs control so that the consumed energy amount is suppressed by the requested suppressed energy amount (100 kW, for example). Specifically, adjustment control is performed for adjusting the consumed energy amount in the adjustment time period P1 so that the consumed energy amount is kept near the requested energy amount W1.

The air conditioners 41, . . . , comprise various sensors, such as thermistors capable of measuring indoor temperature and outside air temperature.

(2) Detailed Configuration of Air Conditioning Control System

Figure 3:
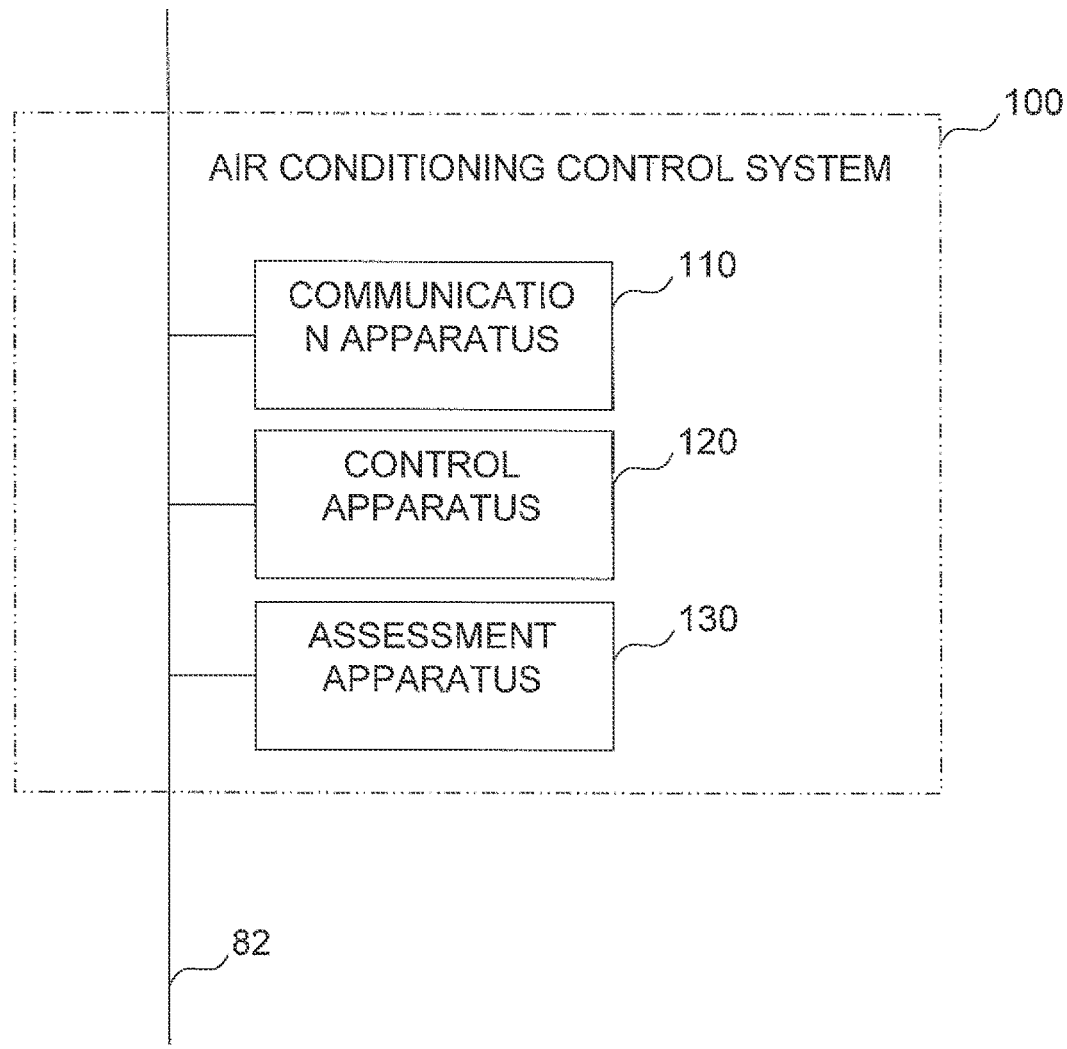
FIG. 3 is a schematic configuration diagram of an air conditioning control system according to the present invention.

FIG. 3 is a schematic configuration diagram of an air conditioning control system 100. The air conditioning control system 100 comprises a communication apparatus 110, a control apparatus 120, and an assessment apparatus 130. The communication apparatus 110, the control apparatus 120, and the assessment apparatus 130 are connected by the communication network. 82 such as a LAN. The detailed configuration of the air conditioning control system 100 is described below. Because the air conditioning control system 100 installed in the property A and the air conditioning control system 100 installed in the property B have the same configuration, the air conditioning control system 100 installed in the property A in FIG. 2 is described from here on unless otherwise specified.

(2-1) Communication apparatus 110

Figure 4:
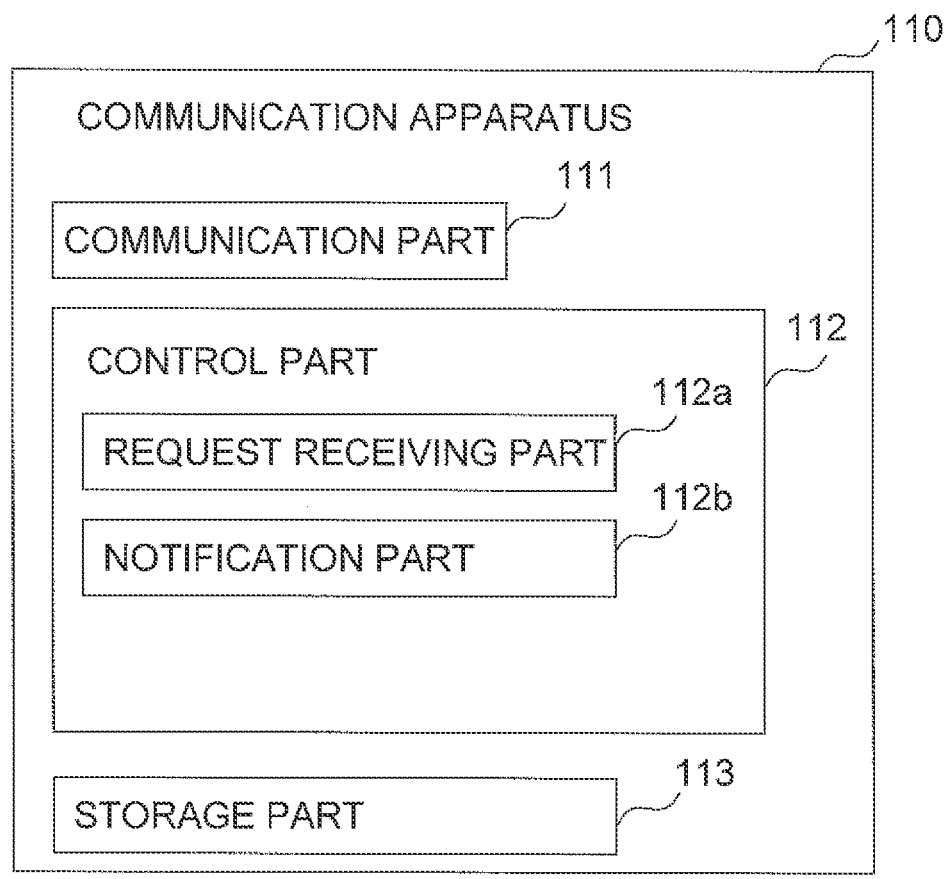
FIG. 4 is a schematic configuration diagram of a communication apparatus according to the present invention.

The communication apparatus 110 is an apparatus for sending and receiving various information, such as the demand adjustment request, to and from the energy management system 90. FIG. 4 is a schematic configuration diagram of the communication apparatus 110. The communication apparatus 110 has primarily a communication part 111, a control part 112, and a storage part 113, as shown in FIG. 4.

The communication part 111 is an interface capable of connecting the communication apparatus 110 with communication networks 81, 82 that use Ethernet (a registered trademark) or the like.

The storage part 113 is composed primarily of RAM, ROM, a hard disk, and the like, and the storage part 113 stores various information such as programs for the communication apparatus.

The control part 112, which is composed primarily of a CPU, executes programs for the communication apparatus stored in the storage part 113. By executing programs for the communication apparatus, the control part 112 functions as a request receiving part 112a, a notification part 112b, and the like.

The request receiving part 112a receives demand adjustment requests from the energy management system 90. Specifically, demand adjustment requests received by the communication part 111 from the energy management system 90 via the communication network 81 are stored in the storage part 113.

The notification part 112b creates a message informing the energy management system 90 that the next adjustment control can be executed, and the communication part 111 sends this message to the energy management system 90 via the communication network 81.

(2-2) Control Apparatus 120

Figure 5:
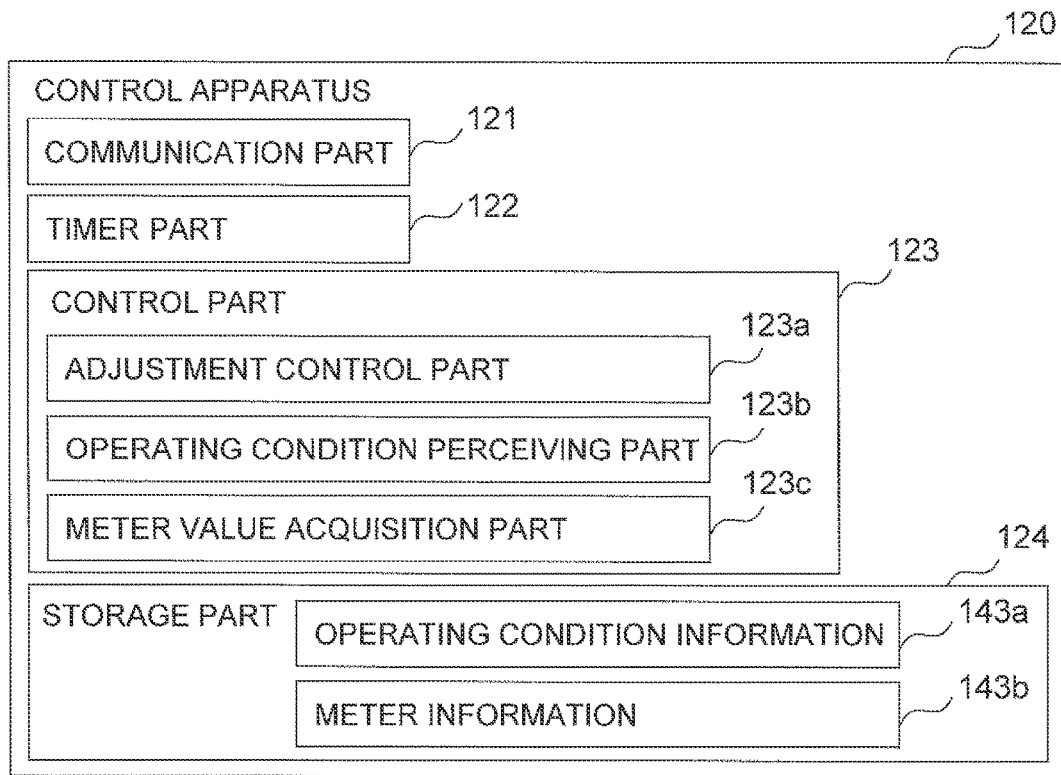
FIG. 5 is a schematic configuration diagram of a control apparatus according to the present invention.

FIG. 5 is a schematic configuration diagram of the control apparatus 120. The control apparatus 120 is an apparatus for controlling the air conditioners 41, . . . , and is connected with the air conditioners 41, . . . via the communication network 82 such as a LAN. The control apparatus 120 has primarily a communication part 121, a timer part 122, a control part 123, and a storage part 124, as shown in FIG. 5.

The communication part 121 is an interface capable of connecting the control apparatus 120 with the communication networks 81, 82 which use Ethernet (a registered trademark) or the like.

The timer part 122 measures temporal elements such as the time, day, month, year, day of the week, and elapsed time duration based on a predetermined time.

The storage part 124 is composed primarily of RAM, ROM, a hard disk, and the like, and the storage part 124 stores various information such as programs for the control apparatus.

The control part 123, which is composed primarily of a CPU, executes programs for the control apparatus stored in the storage part 124. By executing programs for the control apparatus, the control part 123 functions as an adjustment control part 123a, an operating condition perceiving part 123b, a meter value acquisition part 123c, and the like.

The functions of the control part 123 are described below.

The operating condition perceiving part 123b collects information pertaining to the operating condition of the air conditioners 41, . . . at predetermined time intervals (every five minutes, for example). Specifically, the operating condition perceiving part 123b acquires information pertaining to the operating condition of the air conditioners 41, . . . from the air conditioners 41, . . . , and stores this information as operating condition information 143a in the storage part 124. Components such as the adjustment control part 123a refer to the operating condition information 143a stored in the storage part 124 when needing information pertaining to the operating condition of the air conditioners 41, . . . .

At predetermined time intervals (every minute, for example), the meter value acquisition part 123c acquires a meter value (data pertaining to the consumed energy amount) measured by the meter 7. The meter value acquisition part 123c causes the storage part 124 to store this meter value as meter information 143b, in correlation with the air conditioners 41, . . . . Components such as the adjustment control part 123a refer to the meter information 143b stored in the storage part 124 when needing information pertaining to the data pertaining to the consumed energy amount of the air conditioners 41, . . . .

The adjustment control part 123a performs adjustment control on the air conditioners 41, . . . . Adjustment control, as previously described, is a control for controlling the air conditioners 41, . . . so as to suppress the consumed energy amount of all of the air conditioners 41, . . . and to suppress rapid increases in the consumed energy amount of the air conditioners after the adjustment request time period. For example, in adjustment control, the consumed energy amount of the air conditioners 41, . . . is suppressed in the adjustment time period P1 so that the requested suppressed energy amount can be achieved according to the demand adjustment request. Specifically, suppression of the consumed energy amount is performed by limiting the operating capability of each air conditioner 41, . . . in the adjustment time period P1. To limit the operating capability is to stop the compressors or reduce the rotational speed of the compressors in the case of air conditioners 41, . . . capable of air-cooling and air-warming operations, or to stop the ventilation function or reduce the frequency of ventilation in the case of air conditioners 41, . . . having a ventilation function, for example.

The adjustment control part 123a controls each of the air conditioners 41, . . . by transmitting a command to the control part of each air conditioner 41, . . . via the communication network 82.

(2-3) Assessment Apparatus 130

Figure 6:
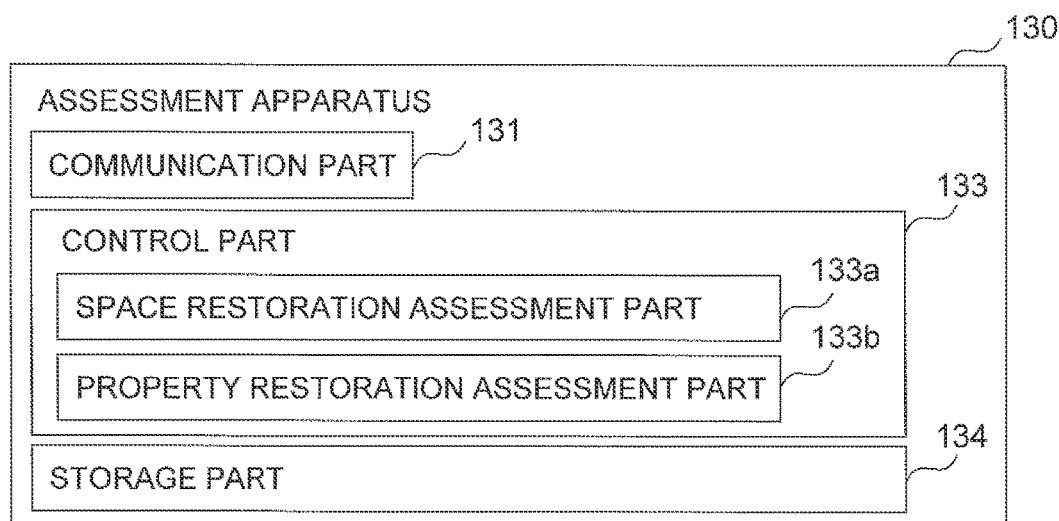
FIG. 6 is a schematic configuration diagram of an assessment apparatus according to the present invention.

FIG. 6 is a schematic configuration diagram of the assessment apparatus 130. The assessment apparatus 130 is an apparatus for assessing whether or not the next adjustment control can be performed after the adjustment time period P1 on the basis of environmental parameters in the air conditioned space, and is connected with each air conditioner 41, . . . via the communication network 82 such as a LAN. The assessment apparatus 130 has primarily a communication part 131, a control part 133, and a storage part 134, as shown in FIG. 6.

The communication part 131 is an interface capable of connecting the assessment apparatus 130 with the communication networks 81, 82 which use Ethernet (a registered trademark) or the like.

The storage part 134 is composed primarily of RAM, ROM, a hard disk, and the like, and the storage part stores various information such as programs for the assessment apparatus.

The control part 133, which is composed primarily of a CPU, executes programs for the assessment apparatus stored in the storage part 134. By executing programs for the assessment apparatus, the control part 133 functions as a space restoration assessment part 133*a*, a property restoration assessment part 133*b*, and the like.

The functions of the control part 133 are described below.

When there are a plurality of air conditioned spaces in the property A as shown in FIG. 9, the space restoration assessment part 133*a* makes individual assessments, which are assessments of the adjustment possible amount in the next adjustment control, for each of the air conditioned spaces on the basis of environmental parameters. The environmental parameters are the temperatures in the air conditioned spaces (referred to as indoor temperatures below) and the like. The values of environmental parameters such as temperature are not limited to current values, and include past values as well. The details of the individual assessments are described below.

The property restoration assessment part 133*b* makes an overall assessment, which is an assessment of the adjustment possible amount in the next adjustment control, for the entire property A. The property restoration assessment part 133*b* performs the overall assessment on the basis of the individual assessments of the space restoration assessment part 133*a*. The details of the overall assessment are described below.

(3) Flow of Control Performed by Air Conditioning Control System 100

Figure 7:
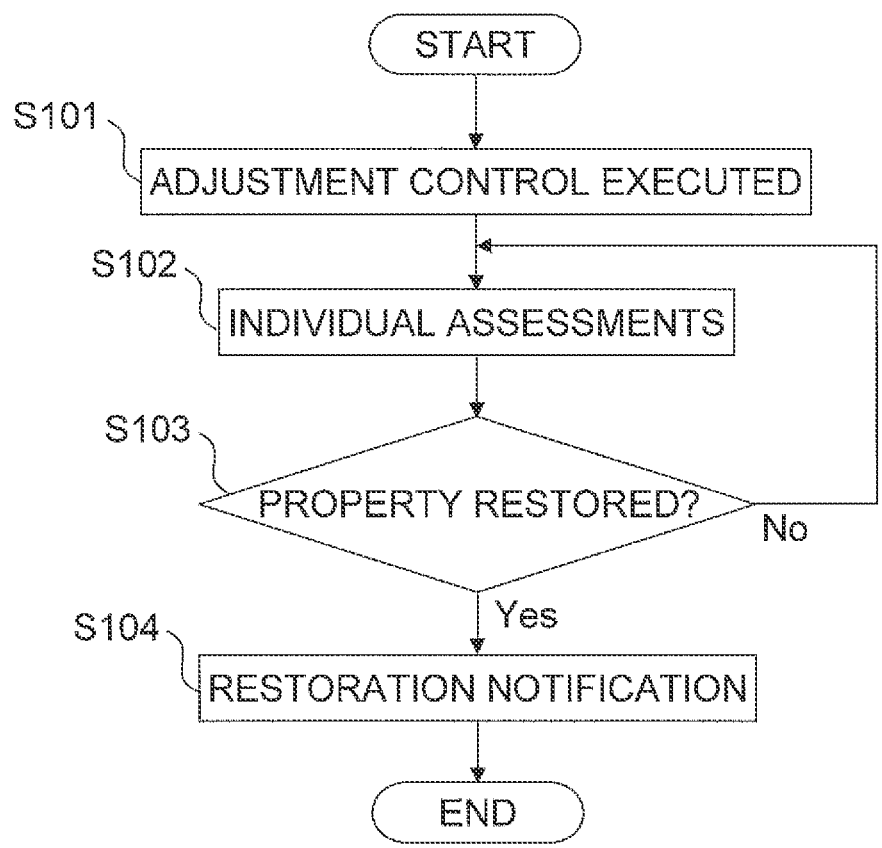
FIG. 7 is a flow diagram of control performed by an air conditioning control system.

FIG. 7 is a flow chart of the adjustment control performed by the air conditioning control system 100, and the control pertaining to the restoration assessments for the property A and the air conditioned spaces in the property A until the next adjustment control is performed. This control flow is described below with reference to FIG. 7.

In the present embodiment, the control flow begins when the air conditioning control system 100 receives a demand adjustment request from the energy management system 90. Specifically, when the communication part 111 of the communication apparatus 110 receives a demand adjustment request from the energy management system 90, the request receiving part 112*a* stores the demand adjustment request in the storage part 113. The request receiving part 112*a* transmits the demand adjustment request, along with a message stating that the demand adjustment request has been received, to the control apparatus 120 via the communication part 111. When the control apparatus 120 receives this message, the following control flow is initiated.

In step S101, when the adjustment time period P1 arrives, adjustment control is executed on the air conditioners 41, . . . by the adjustment control part 123*a* until the adjustment time period P1 ends. When adjustment control ends, i.e. when the adjustment time period P1 ends, the control flow proceeds to step S102.

In step S102, after a predetermined time period (five minutes, for example) has elapsed, individual assessments are performed by the space restoration assessment part 133*a* on each of the air conditioned spaces of the air conditioners 41, . . . .

In step S103, an overall assessment is performed by the property restoration assessment part 133*b* on the entire property A. When the result of the overall assessment is that the next adjustment control can be performed, or in other words when it is assessed that the environment of the property A has been restored, the control flow proceeds to the next step S104. On the other hand, when the next adjustment control cannot be performed, or in other words when it is assessed that the environment of the property A has not been restored, the control flow returns to step S102.

In step S104, a message informing the energy management system 90 that the next adjustment control can be executed is created by the notification part 112*b* of the communication apparatus 110, and the communication part 111 transmits this message to the energy management system 90 via the communication network 81, (3-1) Individual Assessments Next, the individual assessments performed by the space restoration assessment part 133*a* are described.

The individual assessments are performed based on the temperatures in the air conditioned spaces, i.e. the indoor temperatures. Specifically, any of the following three assessment methods given in the table of FIG. 8 are used. These are assessment methods based primarily on current indoor temperature. Which assessment method is used is set in advance by an operator of the air conditioning control system 100, for example.

(3-1-1) First Assessment Method

The first assessment method assesses the adjustment possible amount in the next adjustment control of the air conditioned space on the basis of current indoor temperature. Specifically, depending on whether the operation is air-cooling or air-warming, this method assesses the adjustment possible amount either according to whether or not the indoor temperature exceeds a predetermined reference value and the extent to which it does so, or according to whether or not the indoor temperature falls below a predetermined reference value and the extent to which it does so. For example, if the indoor temperature during air-cooling exceeds 26° C. by 1° C., it is assessed that a 30% adjustment is possible in the next adjustment control for that air conditioned space. If the indoor temperature exceeds 26° C. by 10° C. it is assessed that the adjustment possible amount is 0%, i.e. that space is not restored and the next adjustment control is not possible. Predetermined reference values for both air-cooling and air-warming are stored in the storage part 134.

(3-1-2) Second Assessment Method

The second assessment method assesses the adjustment possible amount in the next adjustment control on the basis of the difference between the current indoor temperature and the current set temperature of the air conditioners. Specifically, the adjustment possible amount in the next adjustment control of that space is assessed based on the difference between the current indoor temperature and the current set temperature of the air conditioners. For example, if the difference between the current indoor temperature and the current set temperature of the air conditioners is 1° C., it is assessed that a 30% adjustment is possible in the next adjustment control for that air conditioned space. If the difference between the current indoor temperature and the current set temperature of the air conditioners exceeds a predetermined range (within 5° C., for example), it is assessed that the adjustment possible amount is 0%, i.e. that space is not restored and the next adjustment control is not possible. The predetermined range (5° C., for example) is stored in the storage part 134.

(3-1-3) Third Assessment Method

The third assessment method assesses the adjustment possible amount in the next adjustment control of the air conditioned space on the basis of the difference between the indoor temperature before the start of the adjustment time period P1 and the current indoor temperature. For example, if the difference between the indoor temperature before the start of the adjustment time period P1 and the current indoor temperature is 1° C., it is assessed that a 30% adjustment is possible in the next adjustment control for that air conditioned space. If the difference between the indoor temperature before the start of the adjustment time period P1 and the current indoor temperature exceeds a predetermined range (within 5° C., for example), it is assessed that the adjustment possible amount is 0%, i.e. that space is not restored and the next adjustment control is not possible. The predetermined range (5° C., for example) is stored in the storage part 134.

(3-2) Overall Assessment

Next, the overall assessment performed by the property restoration assessment part 133*b* is described.

The property restoration assessment part 133*b* assess the adjustment possible amount of the entire property A in the next adjustment control on the basis of the adjustment possible amounts assessed by the individual assessments for all of the air conditioned spaces in the property A. In the present embodiment, when there is even but one air conditioned space of which the adjustment possible amount is 0% as in the example of FIG. 9, the adjustment possible amount for the entire property A is assessed to be 0%, and it is assessed that the environment of the property A has not been restored. In all other cases, it is assessed that the entire property A has been restored. When the entire property A has been restored, the adjustment possible amount of the entire property A is calculated by totaling the adjustment possible amounts of all the air conditioned spaces in the property A.

(4) Characteristics (4-1)

In the above embodiment, the assessment apparatus 130 assesses the adjustment possible amount in the next adjustment control after the adjustment time period P1, on the basis of environmental parameters (temperature) of the air conditioned space. The timing when adjustment control will next be performed can thereby be decided according to the restoration condition of the air conditioned space. Therefore, the timing of performing the next consumed energy amount adjustment can be appropriately established after an adjustment has been performed on the consumed energy amount of all of the air conditioners 41, . . . . As a result, adjustment control is continuously performed while the air conditioned space remains unrestored, whereby degradation of the comfort level of the property A can be suppressed.

(4-2)

In the above embodiment, the adjustment possible amount in the next adjustment control is assessed based on at least the temperature in the air conditioned space. Specifically, it is assessed whether or not the temperature in the air conditioned space has been restored to a comfortable level. It is thereby possible, after the consumed energy amount adjustment has been performed, to appropriately establish the timing for performing the next consumed energy amount adjustment.

(4-3)

In the above embodiment, when there are a plurality of air conditioned spaces, the space restoration assessment part 133*a* performs individual assessments, which are assessments of the adjustment possible amount of the next adjustment control, for each of the air conditioned spaces. Based on the individual assessments, the property restoration assessment part 133*b* performs an overall assessment, which is an assessment of the adjustment possible amount of the next adjustment control, for the entire property A. It is thereby possible to decide the timing for performing the next adjustment control for the entire property A in accordance with the restoration conditions of each air conditioned space in the property A.

(4-4)

In the above embodiment, the adjustment possible amount of the entire property in the next adjustment control is assessed based on the adjustment possible amounts of all the air conditioned spaces in the property A. It is thereby possible to perform the next adjustment control after the comfort level has been restored in all the air conditioned spaces. Therefore, after a consumed energy amount adjustment has been performed, the timing for performing the next consumed energy amount adjustment can be appropriately established.

(4-5)

In the above embodiment, the adjustment possible amount is assessed based on the current temperature in the air conditioned space. Otherwise, the adjustment possible amount is assessed based on the current temperature in the air conditioned space and the temperature prior to the start of the adjustment time period. Therefore, after a consumed energy amount adjustment has been performed, the timing for performing the next consumed energy amount adjustment can be appropriately established.

(5) Modifications (5-1) Modification 1A

In the above embodiment, the air conditioning control system 100, which comprises a communication apparatus 110, a control apparatus 120, and an assessment apparatus 130, is configured from a plurality of apparatuses. In another embodiment, however, all the functions of the communication apparatus 110, the control apparatus 120, and the assessment apparatus 130 may be consolidated into a single apparatus, and the air conditioning control system 100 may be configured from a single apparatus. The number of apparatuses constituting the air conditioning control system 100 is also not limited to three or one, and may be increased or decreased as appropriate.

(5-2) Modification 1B

In the above embodiment, the space restoration assessment part 133*a* assesses the adjustment possible amount of each air conditioned space on the basis of factors such as the current indoor temperature. In another embodiment, however, the space restoration assessment part 133*a* may assess the adjustment possible amount of each air conditioned space on the basis of chronological fluctuations in the indoor temperature.

Figure 10:
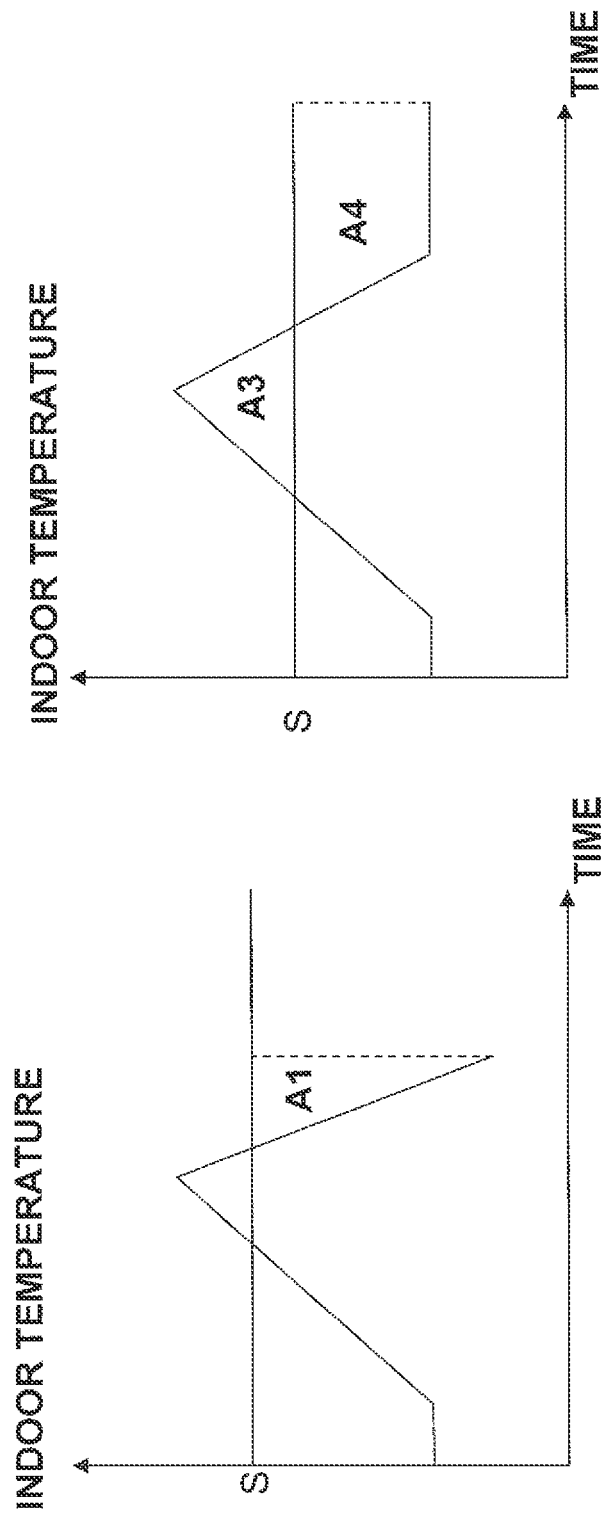
FIG. 10 is graphs showing assessment methods of individual assessments according to a modification.

In the chronological graph of indoor temperature during air-cooling shown in FIG. 10(*a*), for example, the adjustment possible amount is assessed based on an integral value of the portion A1 in which the indoor temperature is at or below a reference value S. If this integral value is not within a predetermined range, the adjustment possible amount of the air conditioned space is assessed to be 0%.

In the chronological graph of indoor temperature during air-cooling shown in FIG. 10(*b*), for example, the integral value of the portion A4 in which the indoor temperature is at or below a reference value S and the integral value of the portion A3 exceeding the reference value S are compared, and the adjustment possible amount is assessed based on the difference between the integral value of the portion A4 at or below the reference value S and the integral value of the portion A3 exceeding the reference value S. During air-warming, conversely, the adjustment possible amount is assessed based on the difference between the integral value of the portion A3 exceeding the reference value S and the integral value of the portion A4 at or below the reference value S.

When air conditioners 41, . . . capable of varying output are installed, for example, an air conditioned space may be assessed to be restored when it is assessed that there is a suppressible energy amount within a range that does not create disadvantage, even if the air conditioned space has not been 100% restored.

The aforementioned predetermined ranges and the reference value S may be stored in advance in the storage part 134.

It is thereby possible to suppress immediate degradation of the comfort level by performing the next adjustment control shortly after the air conditioned space has been restored, and the restoration of the air conditioned space can be assessed more appropriately.

(5-3) Modification 1C

In the above embodiment, if it is determined in the individual assessments that the adjustment possible amount is greater than 0% for all air conditioned spaces in the property A, the property restoration assessment part 133b assesses that the entire property A has been restored and assesses the next adjustment possible amount. In another embodiment, however, it may be assessed that the property A has been restored upon the clearing of a predetermined condition determined from the convenience of the property A, or in other words, the adjustment possible amount in the next adjustment control may be assessed.

The property restoration assessment part 133b may, for example, assess that the next adjustment control may be performed and may assess the adjustment possible amount for the entire property if the individual assessments find that the adjustment possible amount is greater than 0% for a predetermined percentage (e.g. 75%) of the air conditioned spaces in the property A. In the example shown in FIG. 9, three out of four air conditioned spaces have been restored (i.e. 75% have been restored), and the property restoration assessment part 133b therefore assesses that the next adjustment control can be performed.

The property restoration assessment part 133b may also, for example, assess that the next adjustment control may be performed and may assess the adjustment possible amount for the property A if the individual assessments find that the adjustment possible amount is greater than 0% for air conditioned spaces that have a high priority among the air conditioned spaces in the property A. In the example shown in FIG. 9, the space D, which has high priority, is not yet restored, and the property restoration assessment part 133b therefore assesses that the next adjustment control cannot yet be performed.

The aforementioned predetermined percentage or the priority of the air conditioned spaces in the property A may be stored in advance in the storage part 134.

It is thereby possible to assess restoration according to property convenience. As a result, adjustment control can be performed without waiting for a complete restoration of the property, and the comfort level of the property goes mostly undisturbed. As a result, it is less likely that opportunities will be missed to conserve energy and/or to procure incentives such as discount rates. In other words, after a consumed energy amount adjustment has been performed, the timing for performing the next consumed energy amount adjustment can be more appropriately established.

(5-4) Modification 1D

In the above embodiment, the adjustment time period P1 is a time period specified by the demand adjustment request from the energy management system 90. In another embodiment, however, the adjustment time period P1 may be a time period decided by the air conditioning control system 100. In this case, the adjustment control part 123a of the control apparatus 120 designates a time period stored in advance in the storage part 124 as the adjustment time period P1, for example. The adjustment time period P1 may also be decided based on the operating condition of the air conditioners 41, . . . .

Figure 11:
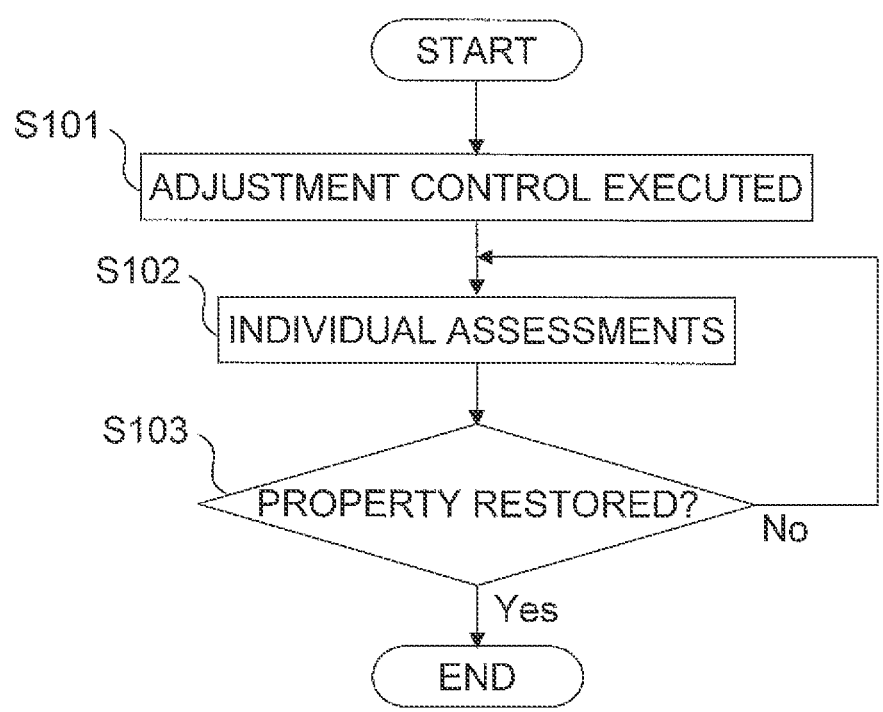
FIG. 11 is a flow diagram of control performed by an air conditioning control system according to a modification.

The adjustment control part 123a may also initiate adjustment control after a predetermined time duration (five minutes, for example) has elapsed after the request receiving part 112a receives a demand adjustment request from the energy management system 90, and the adjustment control part may end adjustment control when a signal informing that the adjustment time period P1 has ended is received from the energy management system 90, (5-5) Modification 1E In the above embodiment, the air conditioning control system 100 performs adjustment control for suppressing the consumed energy amount of all of the air conditioners 41, . . . when a demand adjustment request has been transmitted from the energy management system 90. In another embodiment, however, the air conditioning control system 100 may perform adjustment control for suppressing the consumed energy amount of all of the air conditioners 41, . . . in order to adapt to events such as fluctuations in the energy unit price or increases in the consumed energy amount. For example, during the daytime when energy supply and demand becomes strained (from 1:00 pm to 3:00 pm, for example), when the energy unit price is set comparatively higher than other time ranges, the control apparatus 120 performs control for suppressing the consumed energy amount of all of the air conditioners 41, . . . during a predetermined time period (the adjustment time period P1) in a day time range in order to adapt to these energy unit price fluctuations. In other words, the adjustment control part 123a performs adjustment control. Alternatively, adjustment control may be performed in a predetermined time period (the adjustment time period P1) when the consumed energy amount of all of the air conditioners 41 . . . , greatly increases beyond a predetermined range, regardless of whether or not there are fluctuations in the energy unit price depending on the time range. In this case, the communication apparatus 110 is not necessary, and the control flow shown in FIG. 7 may be modified to the control flow of FIG. 11. When the overall assessment in step S103 finds that the property A has been restored, the control flow may be repeated starting at step S101.

INDUSTRIAL APPLICABILITY

The present invention can be applied to an air conditioning control system for suppressing the consumed energy amount.

What is claimed is:

1. An air conditioning control system adapted to adjust a consumed energy amount of air conditioners installed in a property in an adjustment time period, the air conditioning control system comprising:
   a control apparatus, including a CPU, configured to perform adjustment control of the air conditioners so that the consumed energy amount is adjusted in the adjustment time period, and
   an assessment apparatus, including a CPU, configured to assess whether or not an environmental parameter of an air conditioned space has been restored to a predetermined level, and adjust, after the adjustment time period, a possible amount of a next adjustment control based on the environmental parameter of the air conditioned space,
   at least one environmental parameter being a temperature in the air conditioned space,
   the assessment apparatus including
      a space restoration assessment part configured to make individual assessments of a possible amount of the next adjustment control based on the environmental parameter for each of a plurality of air conditioned spaces when there are a plurality of air conditioned spaces in the property, and a property restoration assessment part configured to make an overall assessment of the possible amount of the next adjustment control for the entire property, and the property restoration assessment part performing the overall assessment based on the individual assessments.

2. The air conditioning control system according to claim 1, wherein the property restoration assessment part is further configured to assess the possible amount of the next adjustment control in the overall assessment, based on the possible amount of the next adjustment control for the air conditioned spaces that have high priority within the property, as assessed in the individual assessments.

3. The air conditioning control system according to claim 1, wherein the property restoration assessment part is further configured to assess the possible amount of the next adjustment control in the overall assessment, based on the possible amount of the next adjustment control for a predetermined percentage of the air conditioned spaces within the property, as assessed in the individual assessments.

4. The air conditioning control system according to claim 1, wherein the property restoration assessment part is further configured to assess the possible amount of the next adjustment control in the overall assessment, based on the possible amount of the next adjustment control for all of the air conditioned spaces within the property, as assessed in the individual assessments.

5. The air conditioning control system according to claim 1, wherein the space restoration assessment part is further configured to perform the individual assessments based on current temperatures in the air conditioned spaces.

6. The air conditioning control system according to claim 1, wherein the space restoration assessment part is further configured to perform the individual assessments based on difference between current temperatures in the air conditioned spaces and current set temperatures of the air conditioners in the air conditioned spaces.

7. The air conditioning control system according to claim 1, wherein the space restoration assessment part is further configured to perform the individual assessments based on a difference between temperatures in the air conditioned spaces before the start of the adjustment time period and current temperatures in the air conditioned spaces.

8. The air conditioning control system according to claim 1, wherein the space restoration assessment part is further configured to perform the individual assessments based on chronological fluctuations in temperatures in the air conditioned spaces during a time period that starts at a present time and ends before a predetermined time period.

9. The air conditioning control system according to claim 1, wherein the assessment apparatus is further configured to assess, after the adjustment time period, the possible amount of the next adjustment control based on a current temperature in an air conditioned space or based on the current temperature in the air conditioned space and a temperature in the air conditioned space before the start of the adjustment time period.

* * * * *